(12) United States Patent
Hale

(10) Patent No.: US 6,186,704 B1
(45) Date of Patent: Feb. 13, 2001

(54) TOOLHOLDER WITH DETACHABLE BLADE

(75) Inventor: John G. Hale, Greensburg, PA (US)

(73) Assignee: Kennametal Inc., Latrobe, PA (US)

( * ) Notice: Under 35 U.S.C. 154(b), the term of this patent shall be extended for 0 days.

(21) Appl. No.: 09/262,718

(22) Filed: Mar. 4, 1999

(51) Int. Cl.⁷ .................................................. B23B 27/08
(52) U.S. Cl. ........................ 407/101; 407/107; 407/109; 407/117
(58) Field of Search .................................. 407/100, 101, 407/107, 109, 117, 42, 46, 50

(56) References Cited

U.S. PATENT DOCUMENTS

| | | | |
|---|---|---|---|
| 2,836,240 | * 5/1958 | Nuding | 407/117 X |
| 2,846,756 | 8/1958 | Novkov | 29/96 |
| 2,964,833 | 12/1960 | Novkov | 29/95 |
| 3,205,558 | * 9/1965 | Stier | 407/117 X |
| 3,436,799 | * 4/1969 | Kopy | 407/107 X |
| 3,505,715 | 4/1970 | Germani | 29/96 |
| 3,688,366 | 9/1972 | Jones | 29/96 |
| 3,748,710 | 7/1973 | Lynch | 29/96 |
| 3,758,927 | 9/1973 | Stein | 29/96 |
| 3,775,818 | 12/1973 | Sirola | 29/96 |
| 3,780,408 | 12/1973 | McCreery | 29/96 |
| 3,802,042 | 4/1974 | Novkov | 29/96 |
| 3,844,008 | 10/1974 | Sletten | 29/96 |
| 3,852,859 | 12/1974 | Carpenter | 29/96 |
| 4,604,004 | 8/1986 | Armbrust | 407/110 |
| 4,898,054 | 2/1990 | Byström et al. | 82/160 |
| 5,112,164 | 5/1992 | Pano | 407/110 |
| 5,688,080 | 11/1997 | Hedlund | 407/101 |
| 5,709,508 | 1/1998 | Barazani et al. | 407/101 |
| 5,921,724 | * 7/1999 | Erickson et al. | 407/109 X |
| 6,000,885 | * 12/1999 | Erickson | 407/117 X |

FOREIGN PATENT DOCUMENTS

| | | | |
|---|---|---|---|
| 2411759 | 9/1974 | (DE) . | |
| 3816931 | * 12/1988 | (DE) | 407/117 |
| 0611622 | 10/1998 | (EP) . | |
| 2165469 | 8/1973 | (FR) . | |
| 363057114 | * 3/1988 | (JP) | 407/117 |
| WO 9612592 | 5/1996 | (WO) . | |

* cited by examiner

Primary Examiner—Henry Tsai
(74) Attorney, Agent, or Firm—Larry R. Meenan

(57) ABSTRACT

A toolholder assembly for holding a cutting insert has a removable blade for mounting the cutting insert and a toolholder body for mounting the removable blade. The removable blade fits within a pocket in the toolholder body having angled sides to positively capture the blade.

23 Claims, 4 Drawing Sheets

TOOLHOLDER WITH DETACHABLE BLADE

BACKGROUND OF THE INVENTION

1. Field of the Invention

The invention is directed to a toolholder for cutting inserts used for metalworking operations and, more specifically, a blade which secures a cutting insert and is removably attached to the toolholder.

2. Description of the Related Art

During a metalworking operation in which a cutting insert is used to produce a slot for grooving or for cutting off a workpiece, the thickness of the slot imparted by the cutting insert dictates the thickness of the toolholder supporting the cutting insert. As an example, if a cutting insert must penetrate a workpiece to a depth of two inches in order to perform a cutting operation, then at least two inches of the toolholder must also extend within the slot created by the machining operation. It is not unusual to create a groove having a thickness of less than one-sixteenth inch and, as a result, the associated portion of the toolholder must be slightly less than one-sixteenth inch to clear the machined slot. Because of this low thickness, the toolholder may be relatively fragile and any unexpected forces upon the toolholder may be sufficient to damage the toolholder.

When a portion of the toolholder supporting the cutting insert is an integral part of the toolholder, and when the toolholder is damaged and must be replaced, the entire toolholder must be replaced. This is expensive and inconvenient even when the toolholder is a relatively simple and conventional square shank toolholder. However, it is especially expensive and inconvenient when the toolholder is of a type designed for quick change applications. Under these circumstances, the end of the toolholder opposite the cutting insert may be intricately machined so that it may be relatively easily mounted and dismounted within the spindle of a machine tool. For that reason, replacement of such a toolholder can be very expensive.

U.S. Pat. No. 4,898,054 to Bystrom et al. discloses an arrangement utilizing a planar elongated blade with top and bottom angled surfaces which engage matching surfaces on the toolholder. The arrangement also utilizes a wedge to clamp a protruding portion of the blade against the toolholder. Not only is the design of the blade relatively complex but the trailing portion of the wedge 12 is not laterally supported at the end of the blade opposite the cutting insert.

U.S. Pat. No. 5,688,080 to Hedlund is directed to a removable blade utilizing bolts extending through the side of a blade to secure the blade within a toolholder. The blade has a cavity which mates with a projection from the toolholder to provide additional lateral support from the blade. However, just as before, this arrangement provides little lateral support to the blade.

A design is therefore sought for a detachable blade on a toolholder whereby the detachable blade is amply supported in both lateral and vertical directions to resist forces imposed upon the blade during a machining operation.

SUMMARY OF THE INVENTION

The invention is directed toward a toolholder for securing a blade designed to hold a cutting insert, wherein the toolholder is comprised of a toolholder body with a toolholder top face, a toolholder end face and a toolholder side face. The toolholder also has a pocket extending into the toolholder body wherein the pocket has a pocket bottom wall, a pocket end wall, and a pocket side wall. The pocket side wall is recessed from the toolholder side face and the pocket bottom wall extends inwardly and downwardly from the toolholder side face to the pocket side wall to form an acute angle TA with a line perpendicular to the pocket side wall. The pocket end wall also extends inwardly and rearwardly from the toolholder side face to the pocket side wall to form an acute angle TB with a line perpendicular to the pocket side wall.

Another embodiment of the invention is directed to a blade for holding a cutting insert, wherein the blade may be mounted within a pocket of a toolholder, comprised of a blade body having a blade first side and a blade second side which are generally parallel to and opposing each other and defining a width therebetween. The blade body also has a blade first end and a blade second end between the sides wherein the blade first side is suitable to receive and secure therein a cutting insert along with a blade top wall and a blade bottom wall between the sides. The blade bottom wall is comprised of a sloped flat extending downwardly from the blade first side toward the blade second side to form an acute angle BA with a line perpendicular to the second side and wherein the blade second end is comprised of a canted flat extending inwardly and rearwardly from the blade first side toward the blade second side to form an acute angle BB with a line perpendicular to the blade second side.

In yet another embodiment of the invention, a toolholder assembly is comprised of the toolholder and blade previously described.

BRIEF DESCRIPTION OF THE DRAWINGS

The above, as well as other features and advantages of the invention, will become apparent through consideration of the detailed description in connection with the several drawings in which.

DETAILED DESCRIPTION ON THE INVENTION

Figure 1:
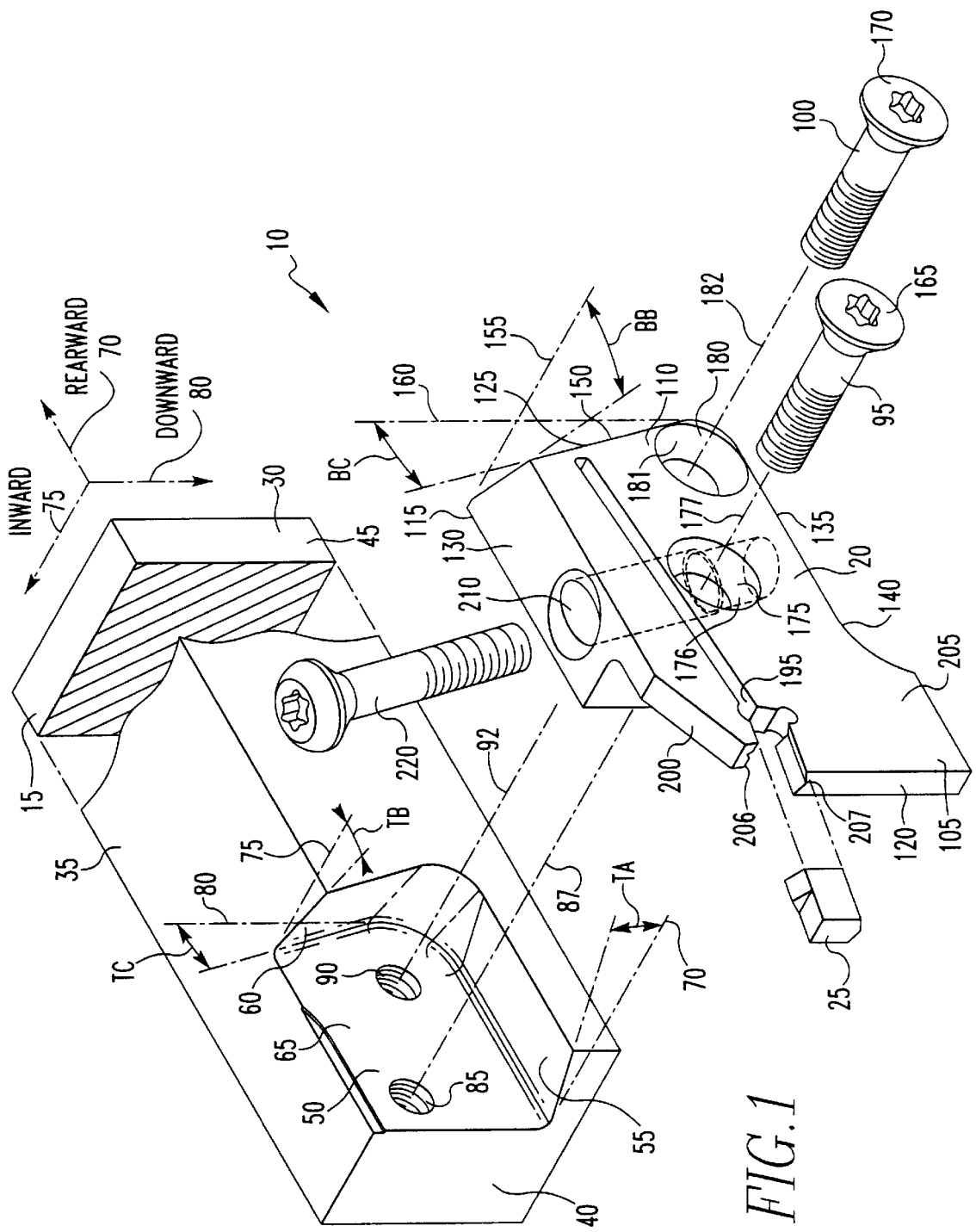
FIG. 1 is an exploded view of the toolholder, blade and toolholder assembly in accordance with the subject invention.

FIG. 1 illustrates an exploded isometric view of the toolholder assembly 10 in accordance with the subject invention. The toolholder assembly 10 is comprised of a toolholder 15 and removable blade 20. Within the removable blade 20, a cutting insert 25 suitable for metalworking applications is mounted.

The insert 25 in FIG. 1 is for illustrative purposes only and it should be understood the subject invention, which is directed toward the toolholder 15 and blade 20, may accommodate any of a large variety of inserts that may be suitable for a blade-type toolholder by, if necessary, modifying the details of the blade used to hold the insert, such as jaws designated by reference numbers 206 and 207.

The toolholder 15 is comprised of a toolholder body 30 having a toolholder top face 35, a toolholder end face 40 and a toolholder side face 45.

A pocket 50 extends into the toolholder body 30 and defines therein a pocket bottom wall 55, a pocket end wall 60 and pocket side wall 65. The pocket side wall 65 is recessed from the toolholder side face 45 and generally defines a planar surface.

For purposes of convenience, a set of orthogonal axes will be defined by arrows represented by reference numbers 70, 75 and 80 representing the rearward, inward and downward directions respectively.

Figure 4:
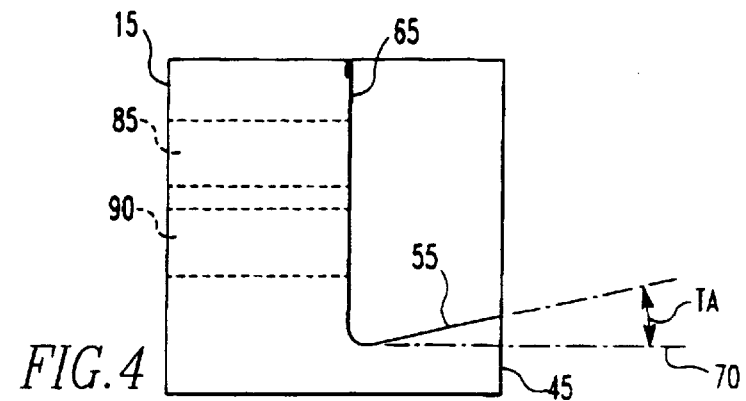
FIG. 4 is an end view of the toolholder in accordance with the subject invention.

As illustrated in FIGS. 1 and 4, the pocket bottom wall 55 extends inwardly and downwardly from the toolholder side face 45 to the pocket side wall 65 to form an acute angle TA with a line 70 perpendicular to the pocket side wall 65. The acute angle TA between the pocket bottom wall 55 and the a line 70 perpendicular to the pocket side wall 65 may be between 0° and 60° with a preferred angle of about 12.5°.

Figure 2:
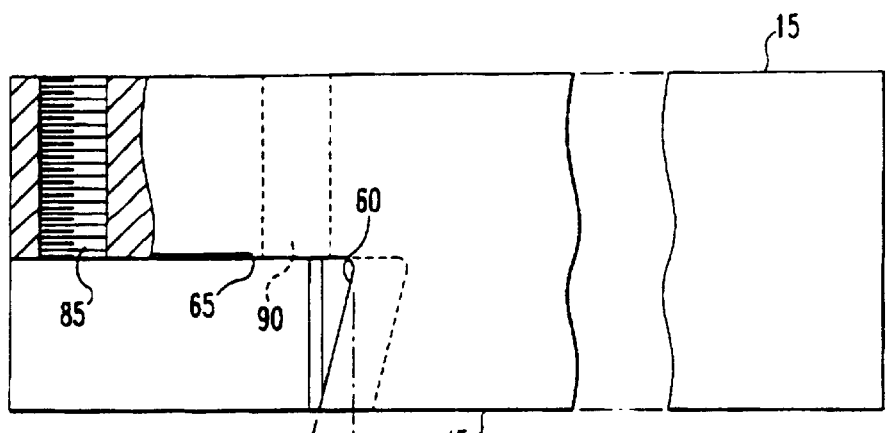
FIG. 2 is a top view of the toolholder in accordance with the subject invention.

As illustrated in FIGS. 1 and 2, the pocket end wall 60 extends inwardly and rearwardly from the toolholder side face 45 to the pocket side wall 65 to from an acute angle TB with a line 75 perpendicular to the pocket side wall 65.

The acute angle TB between pocket end wall 60 and a line 75 perpendicular to the pocket side wall 65 may be between 0° and 60° with a preferred angle of approximately 12.5°.

As will be seen, the arrangement described provides lateral support to blade 20 through the pocket bottom wall 55 and the pocket end wall 60.

Figure 3:
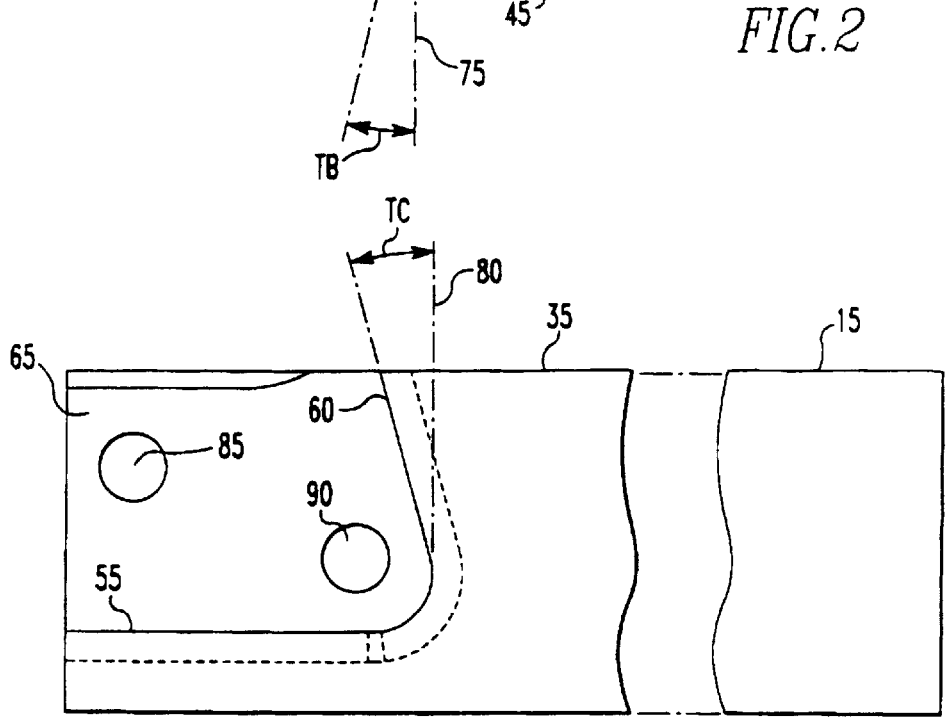
FIG. 3 is a side elevation view of a toolholder in accordance with the subject invention.

The pocket end wall 60 may be used to provide additional support to the blade 20 be incorporating an additional feature. As illustrated in FIGS. 1 and 3, the pocket end wall 60 may further extend downwardly and rearwardly from the toolholder top face 35 to the pocket bottom wall 55 to form an acute angle TC with a line 80 perpendicular to the pocket bottom wall 55 and parallel to the pocket side wall 65. The acute angle TC between the pocket end wall 60 and the line 80 may have a value between 0° and 45° with a preferred angle of approximately 15.5°.

The pocket side wall 65 of the toolholder body 30 may have threaded bores 85, 90 to accept mounting bolts 95, 100 for mounting the blade 20 within the pocket 50.

Directing attention to FIG. 1 and FIGS. 5–7, blade 20 is utilized for holding a cutting insert 25 and the blade 20 is mounted within the pocket 50 of the toolholder 15. The blade 20 is comprised of a blade body 105 having a blade first side 110 and blade second side 115 which are generally parallel to and opposing each other and defining a width W therebetween. The blade body 105 is further comprised of a blade first end 120 and a blade second end 125 between the sides 110, 115 wherein the blade first side 110 is suitable to receive and secure therein the cutting insert 25. The blade body 105 is further comprised of a blade top wall 130 and a blade bottom wall 135 between the sides 110, 115.

Figure 7:
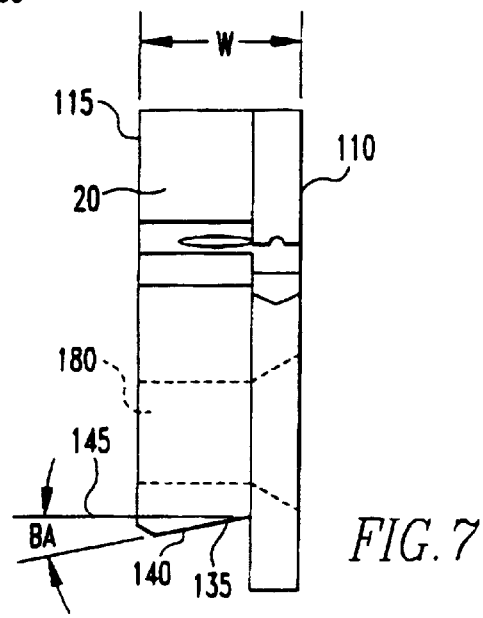
FIG. 7 is an end view of the blade in accordance with the subject invention.

As shown in FIG. 7, the blade bottom wall 135 is comprised of a sloped flat 140 extending downwardly from the blade first side 110 toward the blade second side 115 to form an acute angle BA with a line 145 perpendicular to the blade second side 115. The acute angle BA between the sloped flat 40 and the line 45 perpendicular to the blade second side 115 may have a value between 0 and 60° with a preferred angle of approximately 12.5°.

Figure 5:
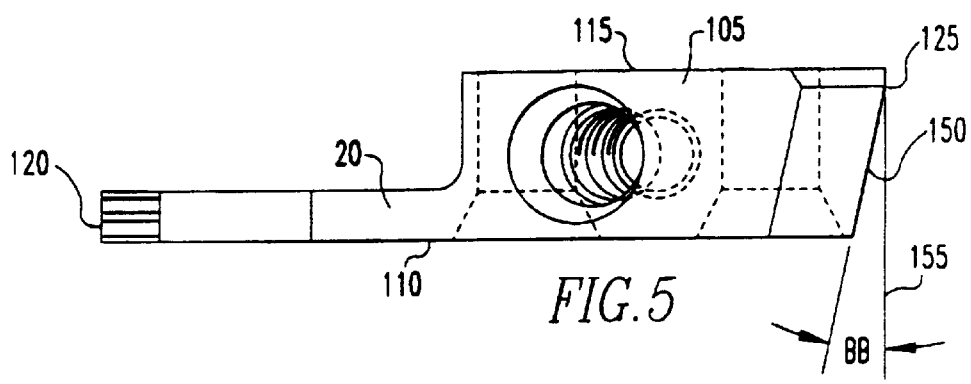
FIG. 5 is a top view of the blade in accordance with the subject invention.

As illustrated in FIG. 5, the blade second end 125 is comprised of a canted flat 150 extending inwardly and rearwardly from the blade first side 110 toward the blade second side 115 to form an acute angle BB with a line 155 perpendicular to the blade second side 115.

The acute angle BB between the canted flat 50 and the line 155 perpendicular to the blade second side 115 may have a value of between 0° and 60° with a preferred angle of approximately 12.5°.

Figure 6:
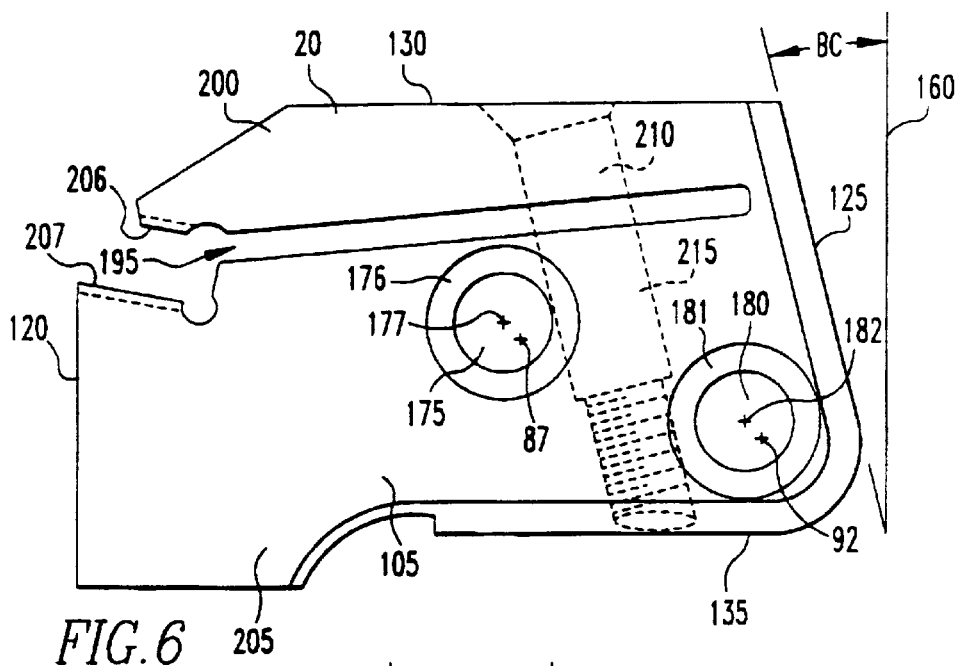
FIG. 6 is a side elevation view of the blade in accordance with the subject invention.

Just as with the toolholder body 15 illustrated in FIG. 1, the canted flat 150 of the blade second end 115, as illustrated in FIG. 6, may further extend downwardly and rearwardly from the blade top wall 130 toward the blade bottom wall 135 to form an acute angle BC with a line 160 perpendicular to the blade bottom wall 135 and parallel to the blade second side 115. The acute angle BC between the canted flat 150 and the line 155 perpendicular to the blade bottom wall 35 and parallel to the blade second side 115 may have a value of between 0° and 45° with a preferred angle of 15.5°.

Briefly returning to FIG. 1, the blade body 105 is intended to fit securely within the toolholder pocket 50 and, for that reason, when the blade 20 is mounted within the pocket 50, the blade bottom wall 135 conforms with the pocket bottom wall 55, the blade second end 125 conforms with the pocket end wall 60, and the blade second side 115 conforms with the pocket side wall 65.

Mounting bolts 95, 100 have conical heads 165, 170 respectively. The blade 20 has receiving bores 175 and 180 with conical counterbores 176, 181 to receive the mounting bolts 95, 100 which are then threadably secured within the bores 85, 90 of the toolholder pocket 50. The receiving bores 175, 180 are countersunk to receive the bolt conical heads 165, 170 thereby securing the blade 20 laterally against the pocket side wall 65.

It is especially important to notice when the blade 20 is secured within the pocket 50, the bottom blade wall 135 and the blade second end 125 are positively retained within the pocket 50 not only by the bolts 95, 100 but also by the pocket bottom wall 55 and pocket end wall 60. In this fashion, the blade 20 is restrained by the pocket 50 in the rearward, inward and downward directions as illustrated by arrows 70, 75, 80 in FIG. 1 and additionally in the outward direction (opposite of inward) since the pocket bottom wall 55 associated with the acute angle TA (FIG. 4) and the pocket end wall 60 associated with the acute angle TB (FIG. 2) positively engage the matching surfaces on the blade 20.

As shown in FIG. 1, to insure the blade 20 fits securely within the pocket 65, the bolts 95, 100 are secured through bores 85, 90 in the toolholder pocket 65. With the blade 20 resting within the toolholder pocket 65, the center lines 87, 92 respectively of each bore 85, 90 are offset from the center lines 177, 182 respectively of the bores 175, 180 through the blade 20. This is more clearly illustrated in FIG. 6 where the toolholder pocket bore center lines 87, 92 are offset to the right and down with respect to the blade bore center lines 177, 182. By doing so when the bolts 95, 100 are secured within the toolholder pocket bores 85, 90, the conical bolt heads 165, 170 will contact the conical counter bores 176, 181 within the blade 20 thereby urging the blade 20 firmly against the walls of the pocket 65.

Directing attention to FIGS. 1 and 6, the blade body 105 has a longitudinal slot 195 to define an upper arm 200 and a blade body base 205 wherein the slot 195 extends from the blade first end 120 toward the blade second end 125 for mounting the cutting insert 25 between two opposing jaws 206, 207 and to provide resilience to mount and dismount the cutting insert 25 within the slot 195. The upper arm 200 has a bore 210 extending downwardly therethrough to align with a mating bore 215 in the blade body base 205 for accepting a tightening bolt 220 to clamp the upper arm 200 against the cutting insert 25 within the slot 195.

It should be noted that while a longitudinal slot 195 is illustrated in blade 20 to show a mechanism for securing the cutting insert 25 there are many different designs which may be utilized to capture the cutting insert 25 within the blade. The subject invention should not be limited to a blade 20 which retains the cutting insert in the manners shown in FIGS. 1–7. Nevertheless, a cutting insert 25 is installed within the longitudinal slot 195 by resiliently expanding the upper arm 200 to separate the jaws 206, 207. The cutting insert 25 is then placed between the jaws 206, 207 and the tightening bolt 220 is used to secure the upper arm 200 and the jaws 206, 207 against the cutting insert 25.

Figure 8:
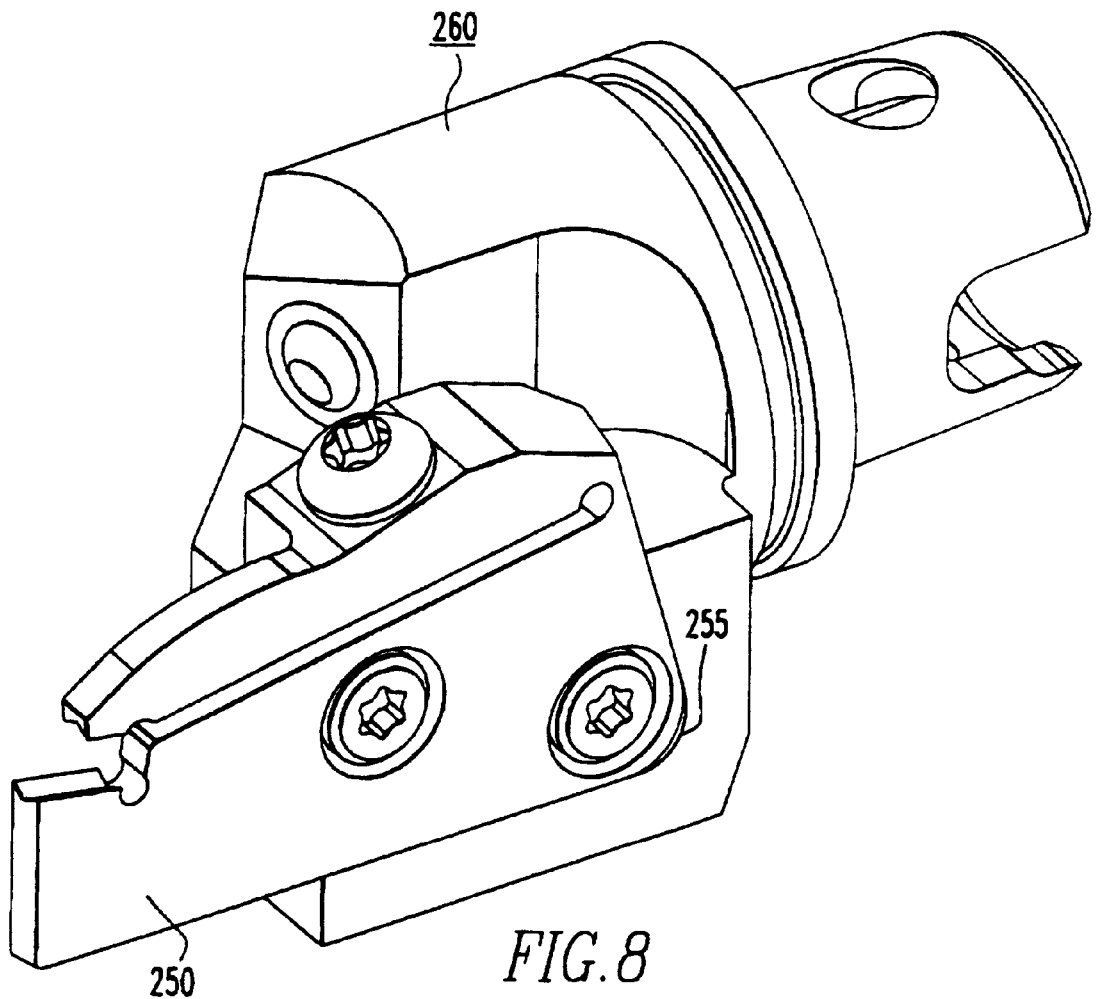
FIG. 8 is an isometric view illustrating another arrangement utilizing the toolholder assembly of the subject invention.

FIGS. 1–7 illustrate a toolholder 15 having a square shank. The subject invention may be utilized with any number of different toolholders and should not be limited to such a square shank. As one example, FIG. 8 illustrates a toolholder having in part a cylindrical shank which may be used for quick change tooling. However, the blade 50 fits within a pocket 255 of the toolholder 260 in the same manner as previously discussed. Therefore, the details of the blade 250 and the pocket 255 and the technique for securing the blade 250 within the pocket 255 are identical to those previously discussed. It should therefore be clear the subject invention may be applied to a wide variety of different toolholders.

Returning to FIG. 1, to assemble the blade 20 within the pocket 50 of the toolholder 15, the blade is set within the pocket 50 so that it rests upon the pocket bottom wall 55, the pocket end wall 60 and the pocket side wall 65. The bores 175, 180 in the blade 20 are aligned with the bores 85, 90 in the pocket side wall 65 such that bolts 95, 100 may be inserted into their respective bores thereby securing the blade 20 within the pocket 50.

What has been described is a toolholder assembly utilizing a blade to secure a cutting insert wherein the blade is securely supported by the toolholder and is removable from the toolholder. The present invention may of course be carried out in other specific ways other than those herein set forth without departing from the spirit and essential characteristics of the invention. The present embodiments are therefore to be considered in all respects as illustrative and not restrictive and all changes coming within the meaning and the equivalency range of the appended claims are intended to be embraced therein.

What is claimed is:

1. A blade for holding a cutting insert within a pocket of a toolholder, comprised of a blade body having:
   a) a blade first side and a blade second side which are generally parallel to and opposing each other and defining a width there between;
   b) a blade first end and a blade second end between the sides wherein the blade first side is suitable to receive and secure therein a cutting insert;
   c) a blade top wall and a blade bottom wall between the sides;
   d) wherein the blade bottom wall is comprised of a sloped flat extending downwardly from the blade first side toward the blade second side to form an acute angle BA with a line perpendicular to the second side; and
   e) wherein the blade second end is comprised of a canted flat extending inwardly and rearwardly from the blade first side toward the blade second side to form an acute angle BB with a line perpendicular to the blade second side; and
   f) a longitudinal slot for mounting the cutting insert therein extending from the blade first end toward the blade second end and defining an upper arm and a blade body base, the upper arm including an angled bore extending downwardly and rearwardly and aligned with a mating threaded bore in the blade body base for accepting a tightening bolt to clamp the upper arm against the cutting insert and securely retain the insert within the slot.

2. The blade according to claim 1 wherein the acute angle BA between the sloped flat and a line perpendicular to the second side is between 0°–60°.

3. The blade according to claim 2 wherein the acute angle BA between the sloped flat and a line perpendicular to the second side wall is 12.5°.

4. The blade according to claim 1 wherein the acute angle BB between the canted flat and a line perpendicular to the blade second side is between 0°–60°.

5. The blade according to claim 4 wherein the acute angle BB between the canted flat and a line perpendicular to the second side wall is 12.5°.

6. The blade according to claim 1 wherein the canted flat of the blade second end further extends downwardly and rearwardly from the blade top wall to the blade bottom wall to form an acute angle BC with a line perpendicular to the blade bottom wall and parallel to the blade second side.

7. The blade according to claim 6 wherein the acute angle BC between the canted flat and a line perpendicular to the blade bottom wall and parallel to the blade second side is between 0°–45°.

8. The blade according to claim 7 wherein the acute angle BC between the canted flat and a line perpendicular to the bottom wall and parallel to the blade second side is 15.5°.

9. The blade according to claim 1 wherein the blade body has a longitudinal slot to define an upper arm and a blade body base, wherein the slot extends from the blade first end toward the blade second end for mounting a cutting insert and to provide resilience to mount and dismount the insert within the slot.

10. The blade according to claim 1 wherein at least one lateral bore extends from the blade first side through the blade second side for receiving a mounting screw to be secured to the toolholder.

11. A toolholder assembly comprised of:
   a) a toolholder having:
      i) a toolholder body with a toolholder top face, a toolholder end face and a toolholder side face;
      ii) a pocket extending into the toolholder body wherein
         A) the pocket has a pocket bottom wall, a pocket end wall, and a pocket side wall;
         B) the pocket side wall is recessed from the toolholder side face;
         C) the pocket bottom wall extends inwardly and downwardly from the toolholder side face to the pocket side wall to form an acute angle TA with a line perpendicular to the pocket side wall; and
         D) the pocket end wall extends inwardly and rearwardly from the toolholder side face to the pocket side wall to form an acute TB angle with a line perpendicular to the pocket side wall;
   b) a blade for holding a cutting insert, wherein the blade is mounted within the pocket of the toolholder, wherein the blade is comprised of a blade body having:

i) a blade first side and a blade second side which are generally parallel to and opposing each other and defining a width therebetween;
ii) a blade first end and a blade second end between the sides, the blade second end including a canted flat extending inwardly and rearwardly from the first side toward the second side to form an acute angle BB with a line perpendicular to the second side and mateable with the pocket end wall of the toolholder;
iii) a blade top wall and a blade bottom wall between the sides, the blade bottom wall including a sloped flat extending downwardly from the first side toward the second side to form an acute angle BA with a line perpendicular to the second side and mateable with the pocket bottom wall of the toolholder; and
iv) a longitudinal slot for mounting the cutting insert therein extending from the blade first end toward the blade second end and defining an upper arm and a blade body base, the upper arm including an angled bore extending downwardly and rearwardly and aligned with a mating threaded bore in the blade body base for accepting a tightening bolt to clamp the upper arm against the cutting insert and securely retain the insert within the slot.

12. The toolholder according to claim 11 wherein the acute angle TA between the pocket bottom wall and a line perpendicular to the pocket side wall is between 0°–60°.

13. The toolholder according to claim 12 wherein the acute angle TA between the pocket wall and a line perpendicular to the pocket side wall is 12.5°.

14. The toolholder according to claim 11 wherein the acute angle TB between the pocket end wall and a line perpendicular to the pocket side wall is between 0°–60°.

15. The toolholder according to claim 14 wherein the acute angle TB between the pocket end wall and a line perpendicular to the pocket side wall is 12.5°.

16. The toolholder according to claim 14 wherein the pocket end wall further extends downwardly and rearwardly from the toolholder top face to the pocket bottom wall to form an acute angle TC with a line perpendicular to the pocket bottom wall and parallel to the pocket side wall.

17. The toolholder according to claim 16 wherein the acute angle TC between the pocket end wall and a line perpendicular to the pocket bottom wall and parallel to the pocket side wall is between 0°–45°.

18. The toolholder according to claim 17 wherein the acute angle TC between the pocket end wall and a line perpendicular to the pocket bottom wall and parallel to the pocket side wall is 15.5°.

19. The toolholder according to claim 11 wherein the pocket side wall has bores therein to accept mounting bolts for mounting a blade within the pocket.

20. The toolholder assembly according to claim 11 wherein the pocket end wall further extends downwardly and rearwardly from the toolholder top face to the pocket bottom wall to form an acute angle TC with a line perpendicular to the pocket bottom wall and parallel to the pocket side wall and wherein the canted flat of the blade second end further extends downwardly and rearwardly from the top wall to the bottom wall to form an acute angle BC with a line perpendicular to the bottom wall and parallel to the blade second side and mateable with the pocket bottom wall of the toolholder.

21. The toolholder assembly according to claim 20 wherein the pairs of acute angles defined by the mateable surfaces between the toolholder pocket and the blade are the acute angle TC and the acute angle BC are equal.

22. The toolholder assembly according to claim 11 wherein at least one lateral bore extends from the blade first side through the blade second side and the pocket side wall has at least one bore therein for accepting a mounting bolt for mounting the blade within the pocket.

23. The toolholder assembly according to claim 22 wherein the mounting bolt has a conical head, the lateral bore through the blade has a centerline and the bore through the pocket has a centerline and wherein the blade bore centerline is offset with respect to the pocket bore centerline such that when the bolt is secured within the pocket bore, the conical head of the bolt acts against the blade to urge the blade firmly against the pocket walls.

* * * * *